United States Patent
Holzwarth et al.

(10) Patent No.: US 10,897,794 B2
(45) Date of Patent: Jan. 19, 2021

(54) APPARATUS FOR A HEATING DEVICE FOR A VEHICLE

(71) Applicant: WEBASTO SE, Stockdorf (DE)

(72) Inventors: Achim Holzwarth, Stockdorf (DE); Stephan Buckl, Stockdorf (DE); Tino Klinkmüller, Stockdorf (DE); Andreas Schmidmayer, Stockdorf (DE); Andreas Reuter, Stockdorf (DE); Thorsten Kabelitz, Stockdorf (DE); Karl Göttl, Stockdorf (DE); Daniel Eckert, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 259 days.

(21) Appl. No.: 15/768,255

(22) PCT Filed: Oct. 28, 2016

(86) PCT No.: PCT/EP2016/076150
§ 371 (c)(1),
(2) Date: Apr. 13, 2018

(87) PCT Pub. No.: WO2017/080856
PCT Pub. Date: May 18, 2017

(65) Prior Publication Data
US 2018/0319251 A1    Nov. 8, 2018

(30) Foreign Application Priority Data
Nov. 9, 2015 (DE) .................. 10 2015 119 252

(51) Int. Cl.
*H05B 3/06* (2006.01)
*B60H 1/22* (2006.01)

(52) U.S. Cl.
CPC ....... *H05B 3/06* (2013.01); *B60H 2001/2268* (2013.01)

(58) Field of Classification Search
CPC .......... B60H 1/2215; B60H 2001/2268; B60H 2001/2278; H05B 3/06; H05B 3/08
See application file for complete search history.

(56) References Cited

U.S. PATENT DOCUMENTS

| 2,600,485 A | 6/1952 | Cox |
| 2,644,066 A * | 6/1953 | Glynn .................. H05B 3/84 338/308 |

(Continued)

FOREIGN PATENT DOCUMENTS

| CN | 1633346 A | 6/2005 |
| CN | 101009235 A | 8/2007 |

(Continued)

OTHER PUBLICATIONS

Examination Report issued against corresponding Japanese Application JP2017-523836 dated May 8, 2018.

(Continued)

*Primary Examiner* — Shawntina T Fuqua
(74) *Attorney, Agent, or Firm* — Fitch, Even, Tabin & Flannery, LLP

(57) ABSTRACT

An apparatus for a heating device for a vehicle comprises a layer stack which, in a stacking direction, has a heating conductor layer, an electrically conductive layer which forms a contact region, wherein a contour in a projection in the stacking direction of the electrically conductive layer is prespecified, in order to prevent a hotspot on the electrically conductive layer, by at least one of a prespecified width of a front side of the electrically conductive layer which faces a central region of the heating conductor layer, a prespecified distance from a joint of the heating conductor layer, and a prespecified curvature of the contour.

19 Claims, 4 Drawing Sheets

(56) References Cited

U.S. PATENT DOCUMENTS

Figure 1:
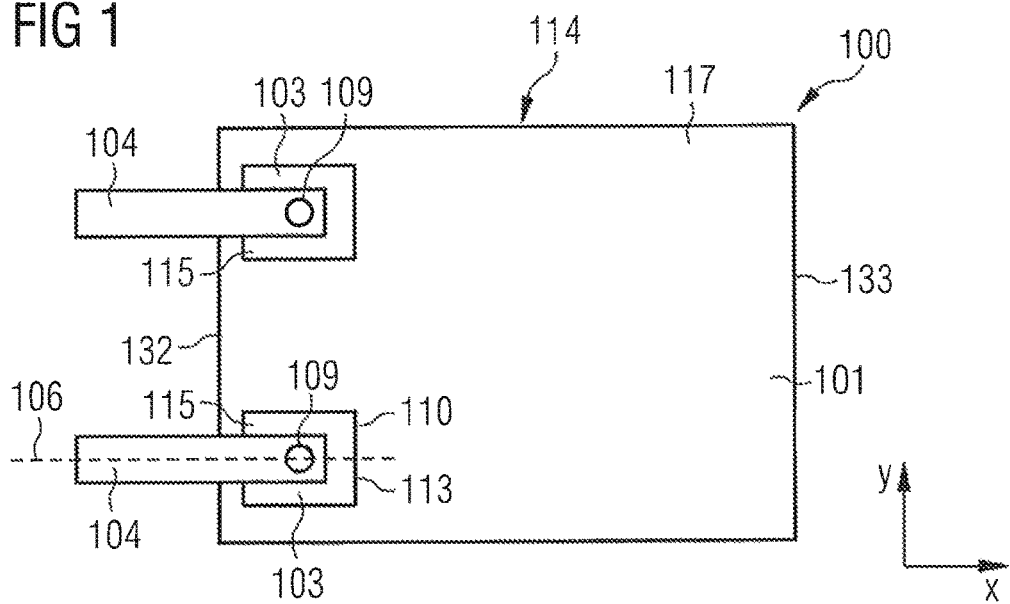

| | | | |
|---|---|---|---|
| 4,251,316 A | 2/1981 | Smallbone | |
| 4,450,346 A | 5/1984 | Boaz | |
| 4,879,449 A | 11/1989 | Duley | |
| 5,304,784 A | 4/1994 | Tagashira et al. | |
| 5,498,850 A | 3/1996 | Das | |
| 7,772,031 B2 | 8/2010 | Tanaka et al. | |
| 8,544,942 B2 | 10/2013 | Lazanja et al. | |
| 8,702,164 B2 | 4/2014 | Lazanja et al. | |
| 9,061,656 B2 | 6/2015 | Royer et al. | |
| 9,196,949 B2 | 11/2015 | Droste et al. | |
| 9,657,963 B2 | 5/2017 | Lazanja et al. | |
| 9,900,932 B2 | 2/2018 | Degen et al. | |
| 2002/0079296 A1 | 6/2002 | Dijken et al. | |
| 2005/0199610 A1 | 9/2005 | Ptasienski | |
| 2007/0172980 A1 | 7/2007 | Tanaka et al. | |
| 2007/0199926 A1 | 8/2007 | Watanabe | |
| 2009/0236321 A1 | 9/2009 | Hayashi et al. | |
| 2009/0277671 A1 | 11/2009 | Hahn | |
| 2011/0081229 A1 | 4/2011 | Kottilingam et al. | |
| 2012/0024832 A1 | 2/2012 | Eck | |
| 2012/0055909 A1 | 3/2012 | Miyake et al. | |
| 2013/0277352 A1 | 10/2013 | Degen et al. | |
| 2016/0381788 A1 | 12/2016 | Petitgas | |

FOREIGN PATENT DOCUMENTS

| | | |
|---|---|---|
| CN | 102427909 A | 4/2012 |
| CN | 102473995 A | 5/2012 |
| CN | 202841573 U | 3/2013 |
| CN | 103202095 A | 7/2013 |
| CN | 103477706 A | 12/2013 |
| DE | 4330975 A1 | 3/1995 |
| DE | 10 2006 017 675 A1 | 10/2007 |
| DE | 102014004433 A1 | 10/2014 |
| EP | 0572340 A1 | 12/1993 |
| EP | 0 887 884 A2 | 12/1998 |
| FR | 2371116 A1 | 6/1978 |
| JP | S53062539 U | 5/1978 |
| JP | H07 94845 A | 4/1995 |
| JP | H11 215652 A | 8/1999 |
| JP | 2003123947 A | 4/2003 |
| JP | 2010500703 A | 1/2010 |
| JP | 4924771 B2 | 2/2012 |
| JP | 2013531335 A | 8/2013 |
| JP | 2014502408 A | 1/2014 |
| JP | 2002015837 A | 1/2018 |
| KR | 10-2012-0009510 A | 2/2012 |
| WO | 2011149680 A1 | 12/2011 |
| WO | 2012/066112 A1 | 5/2012 |

OTHER PUBLICATIONS

Office Action for Korean Patent Application No. 10-2017-7012274; English translation; dated Oct. 29, 2019.

International Search Report for PCT/EP2016/076150 dated Feb. 8, 2017 and English translation submitted herewith (7 Pages).

"Easy Welding of Copper with Laser Beam" Dr. Ing. S. Olschok et al., ISF; Direkt 47, Apr. 2013, p. 2.

http://trumpflaser.com/de/loesungen/anwendungsfelder/laserschweissen.html.

http://www.rofin.de/de/anwendungen/laserschweissen/.

First Office Action issued against corresponding Chinese Patent Application No. 201680065569.3, dated May 22, 2020, in Chinese (8 pages).

* cited by examiner

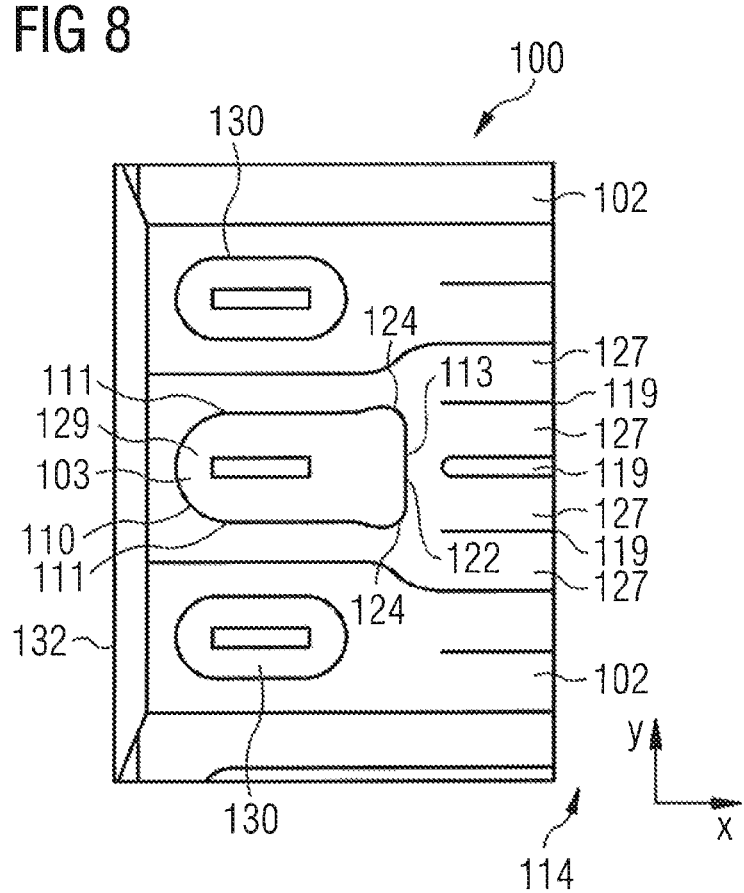

APPARATUS FOR A HEATING DEVICE FOR A VEHICLE

CROSS-REFERENCE TO RELATED APPLICATIONS

This application is a U.S. national phase application filed under 35 U.S.C. § 371 of International Application No. PCT/EP2016/076150, filed Oct. 28, 2016, designating the United States, which claims priority from German Patent Application 10 2015 119 252.7, filed Nov. 9, 2015, which are hereby incorporated herein by reference in their entirety for all purposes.

FIELD

The invention relates to an apparatus for a heating device for a vehicle, in particular for an electrical heating device.

BACKGROUND

Heating devices are used in motor vehicles in order to heat the interior of the motor vehicle. In this respect, use is also made of electrical resistance heating devices. These comprise a heating conductor layer which heats up when an electrical voltage is applied. To this end, the heating conductor layer has to be electrically connected to a voltage source during operation.

It is desirable to specify an apparatus for a heating device for a vehicle which allows for reliable operation.

According to one embodiment of the invention, an apparatus for a heating device for a vehicle has a layer stack. The layer stack has a heating conductor layer. The layer stack has, in a stacking direction, an electrically conductive layer on the heating conductor layer. The electrically conductive layer forms a contact region, in particular a contact region for the heating conductor layer for the purpose of connection to a voltage source. A contour of the electrically conductive layer in a projection in the stacking direction is prespecified, in order to prevent a hotspot on the electrically conductive layer. The contour is prespecified by at least one of:

a prespecified width of a front side of the electrically conductive layer. The front side faces a central region of the heating conductor layer;

a prespecified distance from a joint of the heating conductor layer; and a prespecified curvature of the contour.

The width, the distance and/or the curvature are prespecified such that a sufficiently low current density is achieved at the contact region during operation even with a current flow of, for example, 10 amperes or more, for example up to 20 amperes or up to 30 amperes. Therefore, it is possible to keep temperatures which occur on the electrically conductive layer below a prespecified maximum value during operation. The prespecified maximum value is, for example, 250° C. According to further embodiments, the prespecified maximum value is, for example 200° C. or 195° C.

SUMMARY

In particular, the width, the distance and the curvature are prespecified depending on one another such that the maximum value for the temperature is not exceeded or is not exceeded for a relatively long period of time during operation. Therefore, it is possible to prevent hotspots by means of the prespecification for the contour. Preventing a hotspot means, in particular, that the temperatures remain below the maximum value for the temperature during operation in the immediately adjacent regions of the electrically conductive layer.

By way of example, the width is prespecified to be as large as possible but preferably only wide enough that the prespecified distance is still maintained. The curvature is, for example, prespecified depending on the width and prespecified distance. The width and the curvature are prespecified, in particular, such that the contact region extends in the direction of a conductor track of the heating conductor layer.

Since the contour of the electrically conductive layer is prespecified by the width, the distance and/or the curvature, it is possible to prevent a hotspot at which temperatures occur which are so large that they can have an adverse effect on the reliable operation of the heating device.

According to embodiments, in the projection in the stacking direction along the front side, the prespecified curvature is prespecified by means of two prespecified radii, which are different from one another, for the front side. Therefore, it is possible, in particular, to form a region of the front side, which region is central in the projection, with a relatively large radius. By way of example, the central region of the front side approximates a straight line. The two side regions have a relatively small radius, and therefore are more severely curved. As a result, the contact region is routed in the direction of the conductor track of the heating conductor layer. The contact region is formed such that it has a projecting region in the direction of a current flow which flows from the contact region to the heating conductor layer during operation. As a result, it is possible that the field lines of the electrical field which is produced during operation are concentrated as little as possible and therefore a low current density is realized.

According to embodiments, the the front side has, in the projection in the stacking direction, a straight section. In particular, the straight section is arranged in a central region of the front side. According to embodiments, the curved regions which have one or more prespecified radii are provided on either side of the straight section.

According to further embodiments, the front side has a concave section and a convex section. In this way, it is possible to extend the contact region in the direction of the conductor track of the heating conductor layer and still maintain a sufficiently large distance from the joint.

According to further embodiments, in the projection in the stacking direction, a width of the electrically conductive layer tapers, starting from the width of the front side, at least in a subregion of the electrically conductive layer. The width of the front side in the projection is, for example, greater than a maximum width of the remainder of the electrically conductive layer. The electrically conductive layer is, in the projection in the direction of the current flow which occurs during operation, wider than in the upstream direction. Therefore, it is possible to realize a sufficiently low current density.

According to further embodiments, the apparatus has a conduction strip which is composed of an electrically conductive material. The apparatus has a connection which connects the electrically conductive layer and the conduction strip to one another in order to form electrical and/or mechanical contact with the electrically conductive layer by means of the conduction strip. The conduction strip serves, for example, as an electrical and/or mechanical contact interface to the electrically conductive layer. It is possible to apply a voltage to the electrically conductive layer and therefore the heating conductor layer by means of the conduction strip. The conduction strip can be connected to a power supply system of the motor vehicle by means of further lines for example. By way of example, the connection of the conduction strip to the electrically conductive layer is a welding connection. According to embodiments, the conduction strip is welded to the electrically conductive layer. The conduction strip comprises, for example, copper or is formed from a copper alloy.

According to embodiments, the distance from the joint is prespecified depending on a width of a conductor track of the heating conductor layer transverse to the stacking direction. In particular, the width of the conductor track is prespecified in order to realize a reliable heating output during operation. Depending on the width of the conductor track, the distance from the joint is prespecified such that hotspots are prevented during operation.

According to further embodiments, an area of the electrically conductive layer, which area is averted from the heating conductor layer, is larger than a contact area in which the conduction strip is in contact with the electrically conductive layer. The contact region which is formed by the electrically conductive layer is larger than the region of the conduction strip which forms the common contact area with the heating conductor layer. This makes a further contribution to hotspots being prevented during operation.

According to embodiments, the electrically conductive layer is a thermally sprayed electrically conductive layer. In particular, the electrically conductive layer comprises copper. By way of example, the electrically conductive layer is a thermally sprayed copper layer.

According to embodiments, the heating conductor layer is a thermally sprayed heating conductor layer. A simple option for producing the electrically conductive layer and/or the heating conductor layer is realized in this way.

Owing to the apparatus, it is possible to form the contact region for the heating conductor layer such that a sufficiently high current flow is possible during operation and no hotspots or virtually no hotspots occur in the process.

Further advantages, features and developments will become apparent from the following examples which are explained in connection with the figures.

BRIEF DESCRIPTIONS OF THE DRAWINGS

Figure 2:
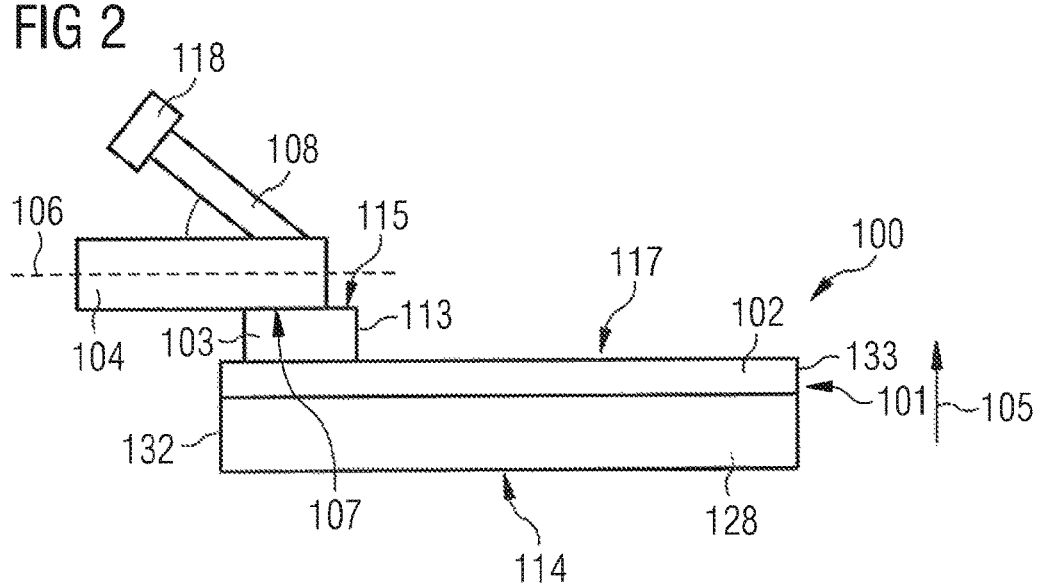
Figure 3:
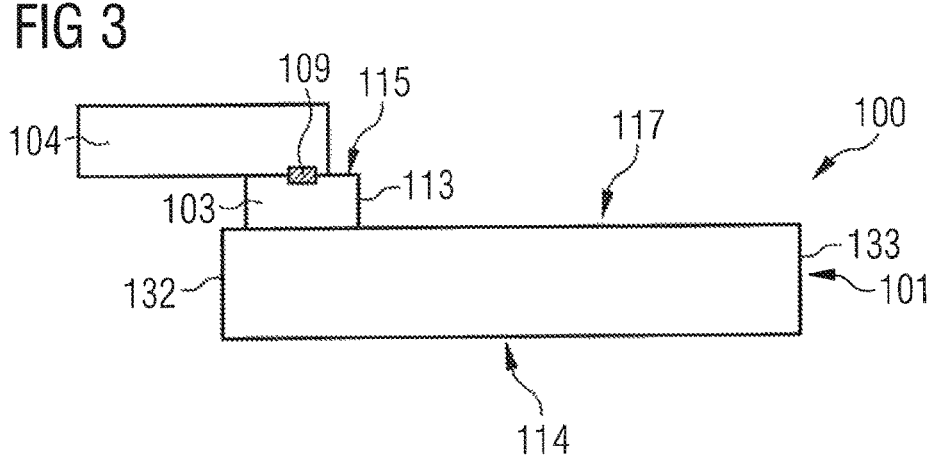
Figure 4:
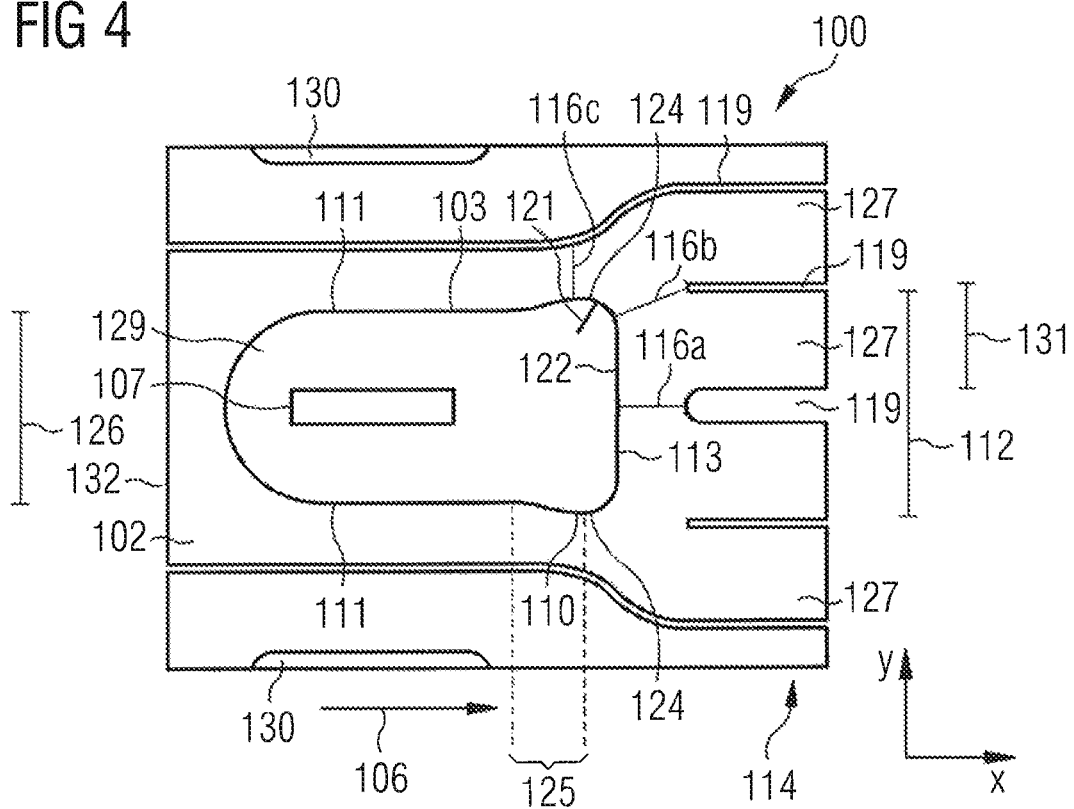
Figure 5:
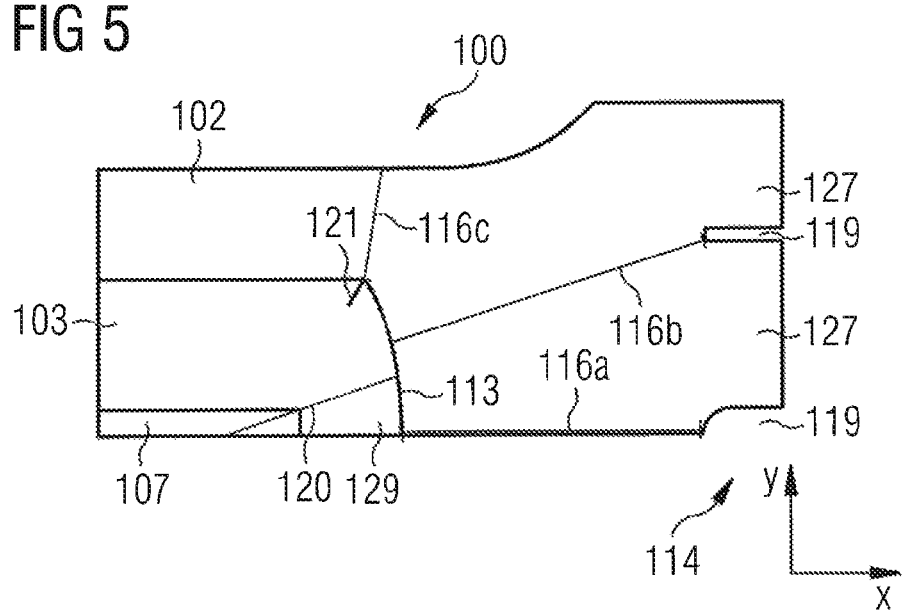
Figure 6:
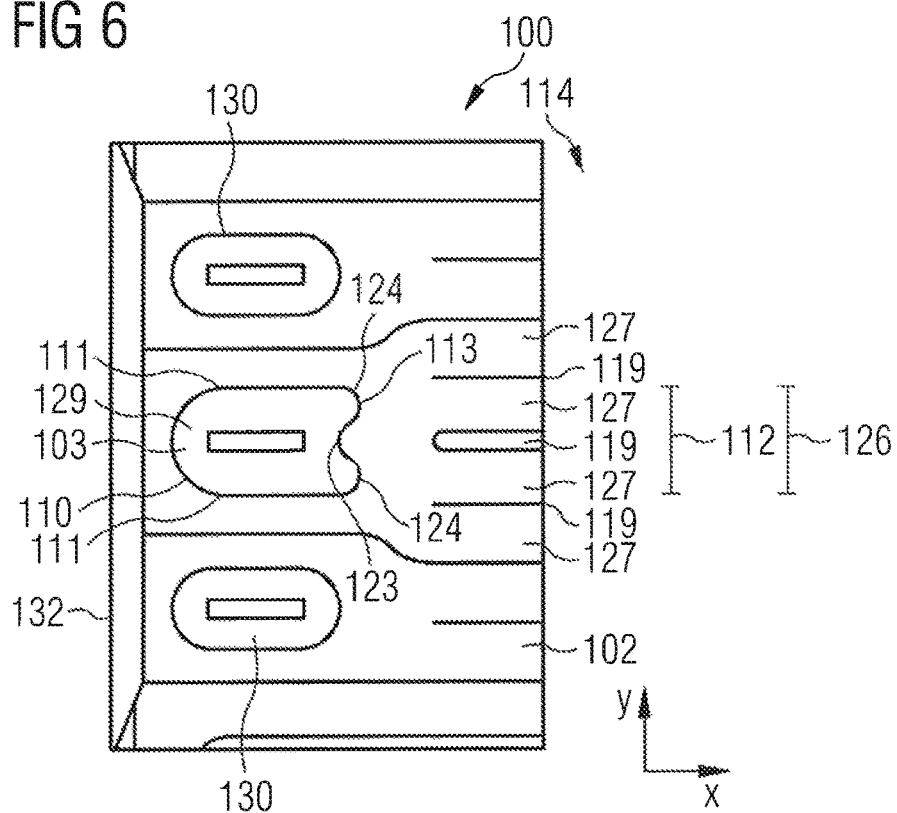
Figure 7:
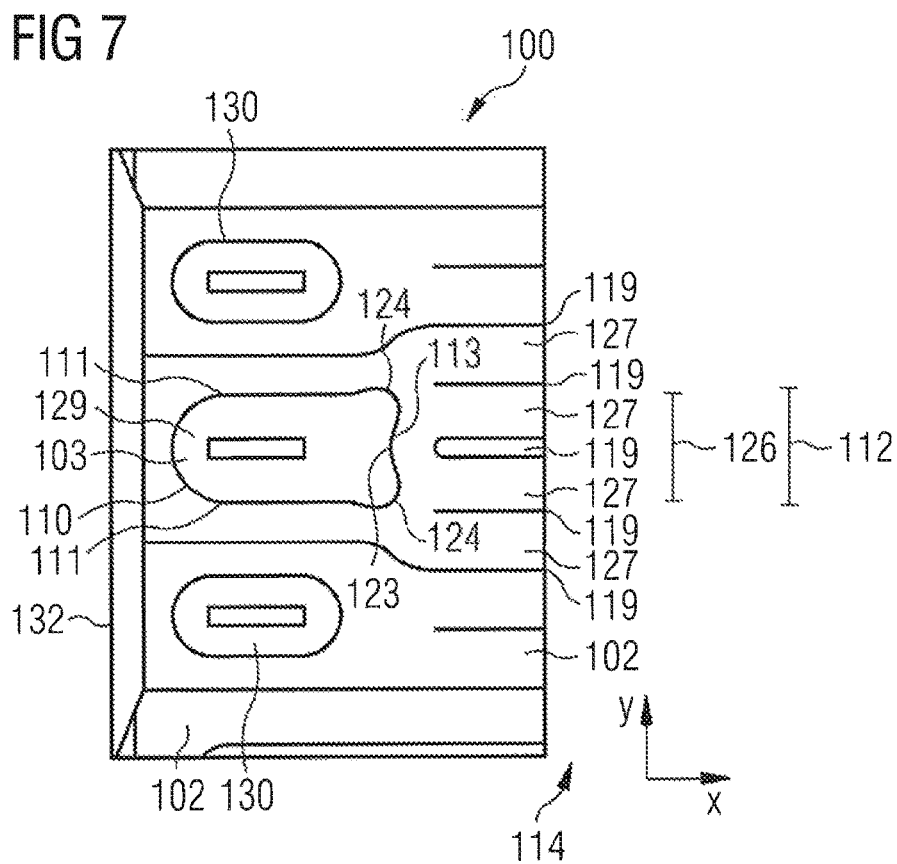

Identical elements, similar elements and elements with the same effect may be provided with the same reference signs throughout the figures, in which:

FIG. 1 shows a schematic plan view of an apparatus according to one embodiment,

FIG. 2 shows a schematic illustration of a sectional view of the apparatus according to one embodiment, FIG. 3 shows a schematic illustration of a sectional view of the apparatus according to one embodiment, FIG. 4 shows a schematic illustration of a contact region of one embodiment, FIG. 5 shows a schematic view of a detail of an apparatus according to one embodiment, FIG. 6 shows a schematic plan view of an apparatus according to one embodiment, FIG. 7 shows a schematic plan view of an apparatus according to one embodiment, and FIG. 8 shows a schematic plan view of an apparatus according to one embodiment.

DETAILED DESCRIPTION

FIG. 1 shows a schematic plan view of an apparatus 100. In particular, FIG. 1 shows a projection of the apparatus 100 on the x-y plane. The apparatus 100 is, in particular, part of a heating device for a motor vehicle. The heating device is an electrical heating device which generates heat when a voltage is applied during operation.

The apparatus 100 has a layer stack 101. The layer stack 101 has a heating conductor layer 102. The heating conductor layer 102 is formed from a material which heats up when an electrical voltage is applied. The heating conductor layer 102 is produced, in particular, by means of thermal spraying. According to further exemplary embodiments, the heating conductor layer is produced by means of another method which is suitable for applying the conductive material for the heating conductor layer to further layers 128 (FIG. 2) of the layer stack 102. The heating conductor layer 102 comprises, in particular, nickel and chromium (NiCr).

An electrically conductive layer 103 is applied to a portion of a surface 117 of the heating conductor layer 102. The electrically conductive layer 103 is applied, in particular, in two or more subregions of the surface 117 in order to form contact regions for the heating conductor layer 102.

The electrically conductive layer 103 is applied, in particular, by means of a thermal spraying process, in particular by means of atmospheric plasma spraying. According to further exemplary embodiments, the electrically conductive layer 103 is applied by means of another production method. The electrically conductive layer 103 comprises copper or a copper alloy. According to further exemplary embodiments, another sufficiently highly electrically conductive material is used for the electrically conductive layer 103.

A conduction strip 104 is applied in a cohesive manner to the electrically conductive layer 103. The conduction strip 104 is connected to the electrically conductive layer 103 by means of a welding connection 109 in particular. Other types of connection are also possible, for example a soldering connection.

As shown in FIG. 2, in order to form the welding connection, a laser beam 108 of a laser 118 is emitted such that the connection 109 is formed.

As is likewise shown in FIG. 2, the electrically conductive layer 103 is arranged on the surface 117 of the heating conductor layer 102 in a stacking direction 105. A longitudinal direction 106 extends transverse to the stacking direction 105.

The electrically conductive layer 103 has a front side 113 which extends, in cross section, in the direction of the stacking direction 105 and transverse to the longitudinal direction 106. The front side 113 faces a central region 114 of the heating conductor layer 102. The central region 114 along the longitudinal direction 106 is arranged between two outer edges 132 and 133.

The central region 114 is arranged along the longitudinal direction 106 approximately in the center of the surface 117. A main propagation direction of the front side 113 runs along the y direction in the coordinate system of FIG. 1. The front side 113 is that side of the electrically conductive layer 103 which faces the closer outer edge 132. The front side 113 faces the further outer edge 133 which is situated further away. The two outer edges 132 and 133 each run substantially in the y direction.

A surface 115 of the electrically conductive layer 103 is averted from the surface 117 of the heating conductor layer 102 and extends transverse to the stacking direction 105. A contact area 107 at which the electrically conductive layer 103 and the conduction strip 104 are in contact with one another is formed at the surface 115. The surface 115 of the electrically conductive layer 103 is larger than the contact area 107.

FIG. 3 shows the apparatus 100, in which the welding connection 109 is formed, in cross section.

As explained in more detail in connection with FIGS. 4 to 8, the electrically conductive layer 103 has, in a projection in the stacking direction 105, a prespecified contour 110, in particular of one of the contact regions which are formed by means of the electrically conductive layer. FIGS. 4 to 8 each show the projection of the apparatus 100 in the stacking direction 105 on the x-y plane.

FIG. 4 shows a detail of a plan view of the apparatus 100. The apparatus 100 according to FIG. 4 has a central contact region 129 which is formed by means of the electrically conductive layer 103. The apparatus 100 has two further contact regions 130 which are likewise each formed by means of the electrically conductive layer 103. According to further embodiments, more or fewer contact regions, but at least two contact regions 129 and 130, are provided, so that a heating circuit of the heating conductor layer 102 can be connected to a positive pole and a negative pole of a voltage source.

The apparatus 100 according to FIG. 4 has two heating circuits which are each connected to the contact region 129 and one of the further contact regions 130. It is also possible for more than two heating circuits to be provided. In this case, more than two further contact regions 130 are accordingly provided.

In particular, the contour 110 of the contact region 129 is prespecified. According to embodiments, the contour of the further contact regions 130 is designed differently to the contour 110 of the contact region 129.

The contour 110 of the contact region 129 is prespecified by means of a width 112 on the front side 113. In addition, the contour 110 is prespecified by a radius 121 which prespecifies a curvature of the contour 110, in particular a transition to a side 111. The side 111 runs along the longitudinal direction 106 transverse to the front side 113. In addition, the contour 110 is prespecified by means of a distance 116 of the contact region 129 from a joint 119. The joint 119 divides the heating conductor layer 102 into a plurality of conductor tracks 127. If a plurality of joints 119 are arranged adjacent to the contact region 129, such as for example in FIG. 4 three joints 119 in the upper region which forms part of the first heating circuit, a distance 116a, 116b and 116c between the contact region 129 and the respective joint 119 is prespecified in each case. The distance 116 is, in particular, the distance between the outer edge of the joint 119, which outer edge faces the contact region 119, and the outer edge of the contact region 129, which outer edge faces the joint 119.

The contact region 129 has a width 126. The width 126 tapers, starting from the front side 113, along the side 111 in a subregion 125. Therefore, the contact region 129 widens along the longitudinal direction 106. The width 112 of the front side 113 is greater than the width 126 of the contact region 129 at an end of the subregion 125 which faces the front side 113. Therefore, it is possible for the contour 110 to follow a profile of the two direct joints 119 in the region of the front side 113, which joints run, beginning at the outer edge 132, in the direction of the outer edge 133 directly next to the contact region 129 and have a curved profile. These two joints 119 run such that a region of the heating conductor layer 102 which is arranged between these two joints 119 is widened in the region of the front side 113 in the direction of the conductor tracks 127.

By way of example, the contact region 129 is of narrower design at its end which is averted from the central region 114 than at its end which faces the central region 114. This is prespecified, for example, by the radius 121 and the width 112.

The contour 110 which is determined, in particular, by the width 112, the radius 121 and the distance 116 is prespecified such that so-called hotspots are prevented during operation as current flows through the contact region 129 into the heating conductor layer 102. The contour 110 is prespecified such that a maximum temperature remains below a prespecified maximum value during operation, in particular at the contact region 129 and the immediately adjacent regions of the heating conductor layer 102. Therefore, it is possible to keep the temperature below 220° C., for example below 210° C., in particular below 200° C., even in the case of high-voltage applications in the motor vehicle sector of, for example, up to 100 V, and a current flow of up to amperes. Therefore, reliable operation of the heating device is possible and material weakening phenomena can be prevented.

As shown in FIG. 5, according to exemplary embodiments, the contour 110, in particular in the region of the front side 113, is prespecified by the radius 121 and a further radius 120. In particular, the further radius 120 which defines a central region of the front side 113 is larger than the radius 121 which defines the two side regions at the transition to the sides 111. By way of example, the further radius 120 is 11 mm and the radius 121 is 0.5 mm.

According to further embodiments, a straight section 122 is provided in the central region of the front side 113 (FIGS. 4 and 8). The size of the further radius 120 and the size of the radius 121 is in each case prespecified, in particular, depending on the width 112 of the front side 113. The width 112 is in turn prespecified by the installation space for the heating device or the heating conductor layer 102 or the contact region 129.

The width 112 and also the radius 121, the further radius 120 and the straight section 122 which is provided between the curved regions according to embodiments are prespecified such that the contact region 129 extends in the direction of the respectively associated conductor tracks 127 on both sides of the front side 113 which form the transition to the side 111. Therefore, the contact region 129 is formed such that its contour follows a current flow which is directed from the contact area 107, through the electrically conductive layer 103, to the heating conductor layer 102, in particular to the two heating circuits of the heating conductor layer 102, during operation. In this case, the contour 110 is prespecified such that the field lines in the contact region 129 are not concentrated as far as possible, but rather are uniformly distributed as far as possible. Therefore, a low current density is realized at the contact region 129.

FIG. 6 shows a further exemplary embodiment of the contour 110 of the contact region 129. In this embodiment, the width 126 of the contact region 130 is unchanged and equal to the width 112 of the front side 113.

The front side 113 has a convex section 124 transverse to the longitudinal direction 106 and to the stacking direction 105, a concave section 123 which adjoins said convex section, and a further convex section 124.

Owing to this curvature in the front side 113, the contact region 129 is expanded in the direction of the conductor tracks 127. The convex sections 124 are each curved in the direction of the current flow which occurs during operation, as a result of which the current density remains low and therefore a hotspot is prevented. The two convex sections 124 are in the form of projecting regions in the direction of the conductor tracks 127. According to exemplary embodiments, the convex sections 124 each have at least the two radii 120 and 121 which are different from one another.

Therefore, the curvature respectively changes along the convex section 124. According to further embodiments, the convex sections 124 each have a single radius 121. Therefore, the respective curvature does not change along the convex section 124.

According to exemplary embodiments, the concave section 123 has at least two radii which are different from one another. Therefore, the curvature changes along the concave section 123. According to further embodiments, the concave section 123 has a single radius. Therefore, the curvature does not change along the concave section 123.

FIG. 7 shows a further embodiment for the contour 110 of the contact region 129. Comparably to the embodiment of FIG. 6, the front side 113 has two convex sections 124 and the concave section 123 which is arranged between the two convex sections 124. In contrast to FIG. 6, the width 112 of the front side 113 according to the embodiment of FIG. 7 is wider than the width 126 of the contact region 126 in the section which faces the outer edge 132. In addition, the side 111 is longer along the longitudinal direction than in FIG. 6. Therefore, it is possible to route the contact region 129 closer to the conductor tracks 127. The contact area 107 remains unchanged. Therefore, the contact region 129 is routed to the conductor tracks 127 in the direction of the current flow which occurs during operation.

FIG. 8 shows a further embodiment of the contour 110 for the contact region 129. The contour 110 of FIG. 8 corresponds substantially to the contour as illustrated in FIG. 7. In contrast to FIG. 7, according to the exemplary embodiment of FIG. 8, the straight section 122 between the two convex sections 124 is arranged on the front side 113. In connection with the contour 110 according to FIG. 8 too, according to exemplary embodiments, the convex sections 124 each have at least the two radii 120 and 121 which are different from one another. Therefore, the respective curvature changes along the convex section 124. Therefore, the contour 110 has a changing curvature at the transition from the straight section 122 to the sides 111. According to further embodiments, the convex sections 124 each have a single radius 121. Therefore, the respective curvature along the convex section 124 does not change.

Therefore, it is possible, for example, to achieve a maximum temperature at the contact pad of less than 205° C., in particular less than 200° C., for example less than 196° C., at a thickness of the heating conductor layer 102 of 20 μm in stacking direction 105, a thickness of the contact region 129 of 40 μm in stacking direction 105, an applied voltage of 400 V to the contact region 129, an applied voltage of 0 V to the contact region 130 and also an average temperature at the heating conductor layer 102 of 150° C. During operation, the hottest region is, for example, on the heating conductor layer 102 directly at the convex section 124 of the contact region 129. In this region, the prespecified configuration of the contour 110, with corresponding matching of the width 112, the radii 120 and 121 and also the distances 116a, 116b and 116c means that the maximum temperature is at most 60° C. higher than the average temperature in the heating conductor layer 102. This is achieved since the contour 110 is prespecified such that as uniform as possible a profile of the field lines of the current flow is achieved and hotspots are prevented as a result. According to exemplary embodiments, the lowest maximum temperature is achieved at the contact region 129 when the second radius 121 is as small as possible. By way of example, the radius 121 is 0.5 mm. This results in the smallest maximum temperature for a radius 120 of 11 mm.

In addition to the radii of curvature 120 and 121, the width 112 of the front side 113 also plays a role. At a relatively small radius 121, the front side 113 is wider and as a result the field line concentration is weaker. Therefore, less heat is generated owing to a lower current density. Therefore, a maximum temperature of below 195.1° C. is made possible, in particular at the contour 110, as illustrated in FIG. 8. At a radius 121 of 1 mm, a maximum temperature of below 201° C. is made possible, for example, at a radius 120 of 11 mm.

The width 113, the radius 121 and/or the radius 120 and also the distance 116 are prespecified depending on one another. Along the longitudinal direction 106, the contact region has, in the projection in stacking direction 105, at least the subregion 125 in which the width 126 of the contact region 129 is increased in size in relation to the width 112. In addition, the transition between the front side 113 and the two sides 111 is curved, in particular rounded, in each case. The relative dimensions in relation to one another can vary, but are always prespecified such that the effect of the low current density and therefore the prevention of hotspots is achieved. A large number of configurations of the contour 110 which are different from one another are possible, said configurations each always being prespecified by means of the the width 113, the curvature, in particular of the front side 113 at the transition to the sides 111, and the distance 116 and being designed such that a hotspot is prevented during operation. The result of the low current density and the accompanying prevention of hotspots can be achieved, for example, by various modifications depending on the width 131 of the conductor track 127 by the width 112 of the front side 113 first being ascertained, the radii 120 and 121 being ascertained depending on said width, and the distance 116 being ascertained depending on said radii.

The invention claimed is:

1. An apparatus for a heating device for a vehicle, comprising a layer stack which, in a stacking direction, comprises: a heating conductor layer, and an electrically conductive layer which forms a contact region, wherein a side of the electrically conductive layer which faces a central region of the heating conductor layer comprises two protruding convex sections protruding in the direction of a current flow which in operation flows from the contact region to the heating conductor layer.

2. The apparatus according to claim 1, wherein, a projection in the stacking direction along the side comprises a curvature of two radii, wherein the two radii are different from one another.

3. The apparatus according to claim 1, wherein, in a projection in the stacking direction, the side further comprises a straight section.

4. The apparatus according to claim 1, wherein, in a projection in the stacking direction, the side further comprises a concave section.

5. The apparatus according to claim 1, wherein: in a projection in the stacking direction, a width of the electrically conductive layer tapers, starting from the width of the side, at least in a subregion of the electrically conductive layer.

6. The apparatus according to claim 1, further comprising: a conduction strip which is composed of an electrically conductive material, a connection which connects the electrically conductive layer and the conduction strip to one another in order to form electrical and/or mechanical contact with the electrically conductive layer via the conduction strip.

7. The apparatus according to claim 6, wherein the connection is a welding connection.

8. The apparatus according to claim 6, wherein the conduction strip comprises copper.

9. The apparatus according to claim 6, wherein an area of the electrically conductive layer, which area is averted from the heating conductor layer, is larger than a contact area in which the conduction strip is in contact with the electrically conductive layer.

10. The apparatus according to claim 1, wherein the electrically conductive layer is a thermally sprayed electrically conductive layer.

11. The apparatus according to claim 1, wherein the heating conductor layer is a thermally sprayed heating conductor layer.

12. The apparatus according to claim 1, wherein the electrically conductive layer comprises copper.

13. An apparatus for a heating device for a vehicle, comprising a layer stack which, in a stacking direction, comprises:
   a heating conductor layer,
   an electrically conductive layer which forms a contact region,
   wherein a contour in a projection in the stacking direction of the electrically conductive layer maintains temperatures below a maximum value in a range of 195 degrees C. to 250 degrees C. during operation in immediately adjacent regions of the electrically conductive layer.

14. The apparatus according to claim 13 wherein the contour maintains temperatures below a maximum value in a range of 195 degrees C. to 250 degrees C. during operation in immediately adjacent regions of the electrically conductive layer by a prespecified width of a side of the electrically conductive layer which faces a central region of the heating conductor layer, wherein the width of the side of the electrically conductive layer which faces a central region of the heating conductor layer is greater than a width of the contact region at an end of a subregion which faces the side of the electrically conductive layer which faces a central region of the heating conductor layer.

15. The apparatus according to claim 13 wherein the contour maintains temperatures below a maximum value in a range of 195 degrees C. to 250 degrees C. during operation in immediately adjacent regions of the electrically conductive layer by a distance from a joint of the heating conductor layer.

16. The apparatus according to claim 13 wherein the contour maintains temperatures below a maximum value in a range of 195 degrees C. to 250 degrees C. during operation in immediately adjacent regions of the electrically conductive layer by prespecified curvature of the contour wherein, in the projection in the stacking direction along the side, the prespecified curvature is by two radii for the side, wherein the two radii are different from one another.

17. The apparatus according to claim 13, wherein, in the projection in the stacking direction, the side has a straight section.

18. The apparatus according to claim 13, wherein, in the projection in the stacking direction, the side has a concave section and a convex section.

19. The apparatus according to claim 13, wherein: in the projection in the stacking direction, a width of the electrically conductive layer tapers, starting from the width of the side, at least in a subregion of the electrically conductive layer.

* * * * *